Figure 1:
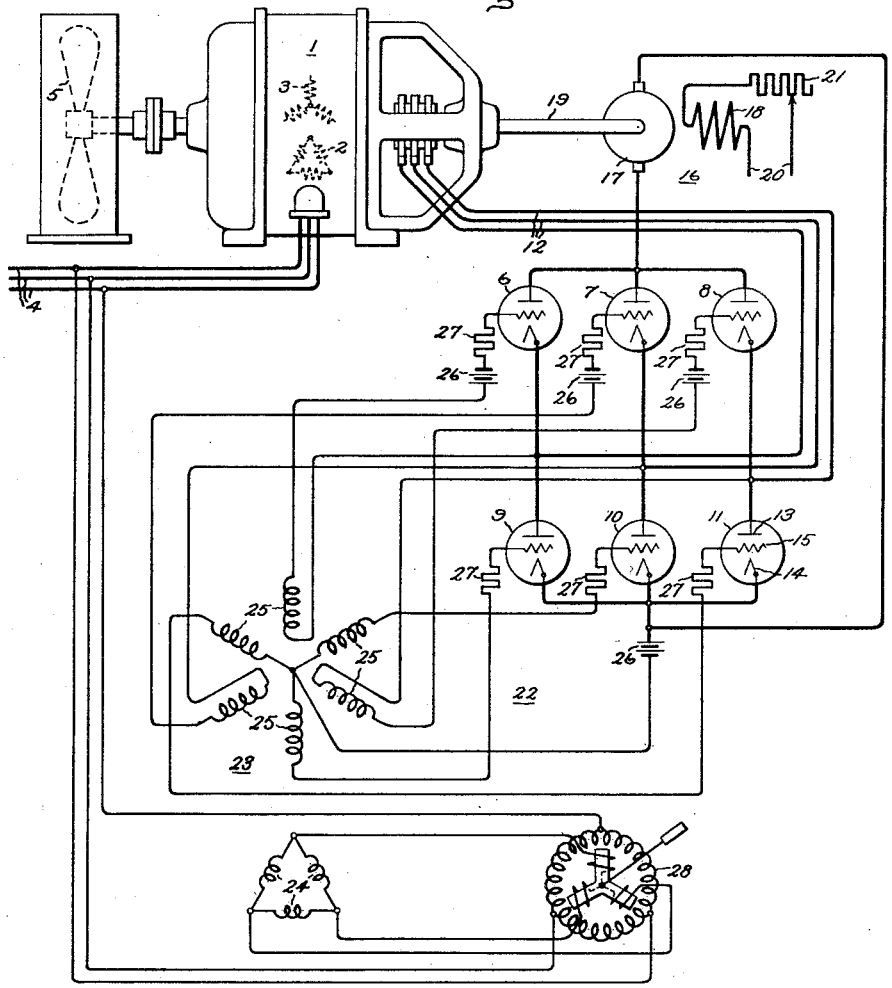

June 30, 1942.  C. H. WILLIS  2,288,338
ELECTRIC MOTOR CONTROL SYSTEM
Filed Oct. 27, 1937  6 Sheets-Sheet 1

Inventor:
Clodius H. Willis,
by Harry E. Dunham
His Attorney.

June 30, 1942.  C. H. WILLIS  2,288,338
ELECTRIC MOTOR CONTROL SYSTEM
Filed Oct. 27, 1937  6 Sheets-Sheet 2

Inventor:
Clodius H. Willis,
by Harry E. Dunham
His Attorney.

June 30, 1942.                      C. H. WILLIS                      2,288,338
                            ELECTRIC MOTOR CONTROL SYSTEM
                              Filed Oct. 27, 1937          6 Sheets-Sheet 3
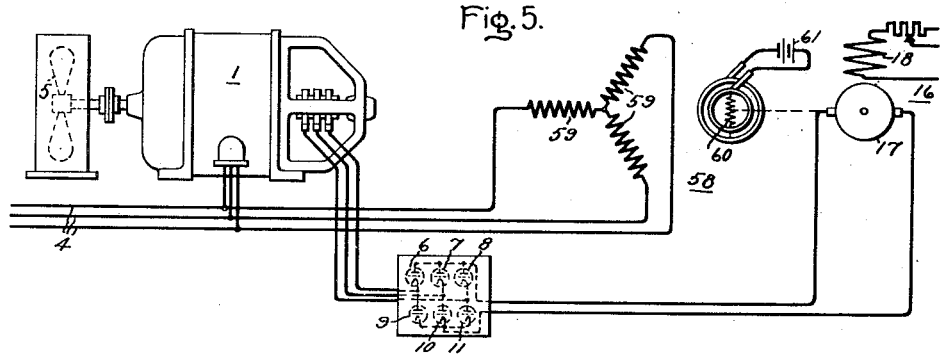
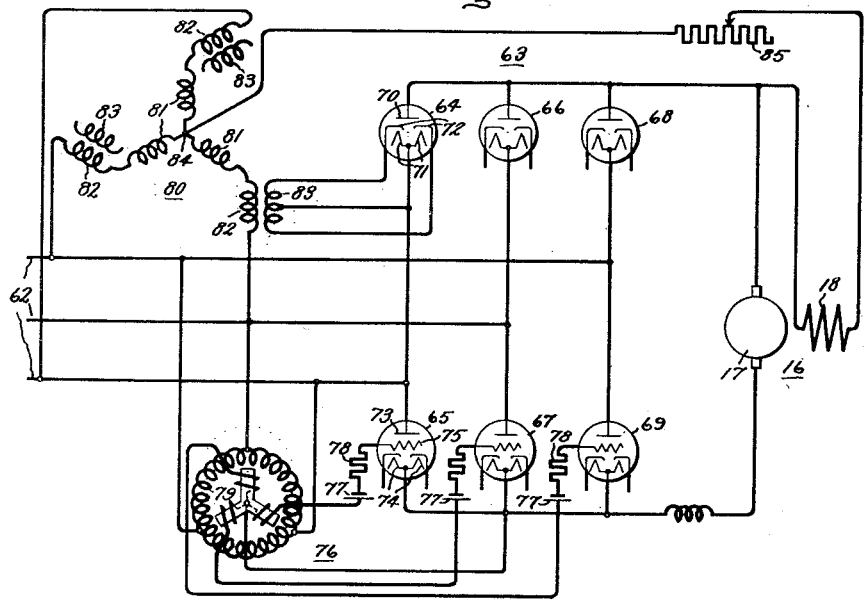
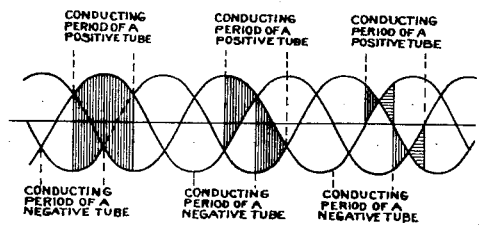
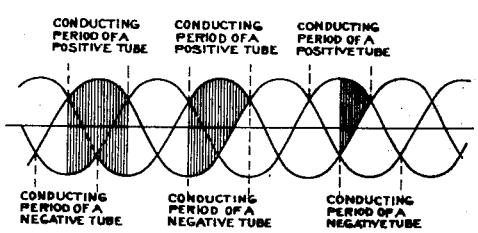
Fig.7.          Fig.8.            Inventor:
                                  Clodius H. Willis,
                            by    Harry E. Dunham
                                  His Attorney.

June 30, 1942.  C. H. WILLIS  2,288,338
ELECTRIC MOTOR CONTROL SYSTEM
Filed Oct. 27, 1937  6 Sheets-Sheet 4

Inventor:
Clodius H. Willis,
by Harry E. Dunham
His Attorney.

Inventor:
Clodius H. Willis,
by Harry E. Dunham
His Attorney.

June 30, 1942.  C. H. WILLIS  2,288,338
ELECTRIC MOTOR CONTROL SYSTEM
Filed Oct. 27, 1937  6 Sheets-Sheet 6

Inventor:
Clodius H. Willis,
by Harry E. Dunham
His Attorney.

UNITED STATES PATENT OFFICE 2,288,338

ELECTRIC MOTOR CONTROL SYSTEM

Clodius H. Willis, Princeton, N. J., assignor to General Electric Company, a corporation of New York Application October 27, 1937, Serial No. 171,354

24 Claims. (Cl. 172—274)

My invention relates to electric control systems and more particularly to electric valve circuits for controlling induction motors.

In the control of dynamo-electric machines of the induction type, it is important to provide control systems which permit great flexibility in the control of the induction machines and which obtain the desired flexibility of control without sacrificing efficiency of operation and economy of apparatus. Heretofore, various arrangements have been devised which permit the control of induction motors by employing electronic discharge devices which are connected in the rotor or secondary winding of the induction motor. Some of these arrangements accomplish the desired speed control, but the speed control has been obtained at a sacrifice of the power factor conditions imposed on the associated alternating current load circuit. Other arrangements have obtained the desired speed control but have necessitated the use of auxiliary apparatus of inordinate proportions relative to the size and rating of the induction motor to be controlled. Therefore, it becomes important in the commercial application of electric valves to the control of induction motors to provide control systems which afford the desired range of speed control and which employ auxiliary control apparatus of proportionate size and rating.

It is an object of my invention to provide a new and improved electric control system.

It is another object of my invention to provide a new and improved electric control system for electric motors.

It is a further object of my invention to provide new and improved electric valve circuits for controlling induction motors.

It is a still further object of my invention to provide new and improved control systems for induction motors whereby there is afforded great flexibility in speed control, and in which the size and rating of the auxiliary control apparatus are of suitable proportions and economy relative to the size of the induction motors to be controlled.

In accordance with the illustrated embodiments of my invention, I provide new and improved electric valve control systems for induction motors wherein a dynamo-electric machine of the direct current type is arranged to absorb or transmit variable amounts of power from the secondary or induced winding of the induction machine through electric valve means of the controlled type. The electric valve means are provided with control members which control the conductivities of the valves, and the power transfer between the induced winding and the direct current machine is controlled by controlling the energization of the control members.

In accordance with another feature of several illustrated embodiments of my invention, I provide an electric valve control system for an induction motor in which an auxiliary direct current machine is provided to control the speed of the induction motor, and in which the speed control is effected by controlling the excitation of the direct current machine and by controlling the conductivities of the electric valves.

In accordance with another illustrated embodiment of my invention, I provide an electric valve control system for an induction motor having inducing and induced windings. The primary or inducing winding is connected to an alternating current supply circuit and the secondary or induced winding is connected to an armature circuit of a direct current dynamo-electric machine through electric valve means. The secondary or induced winding is arranged to be connected in delta or in Y and suitable contact controlling mechanisms are provided to effect selectively these connections. A controlling circuit is provided which controls simultaneously the energization of the excitation circuit of the direct current machine and controls the contact mechanisms to vary the speed of the induction motor in a continuous manner from standstill to substantially synchronous speed.

In accordance with another illustrated embodiment of my invention, I provide an improved control circuit for energizing a direct current motor from an alternating current circuit through electric valve apparatus, whereby there is provided a great flexibility of control. Electric valve apparatus interposed between the alternating current circuit and the armature circuit of the direct current motor is of the full wave type, one half of the electric valves being of the controlled type having control members for controlling the conductivities thereof, and the other half of the electric valves being of the uncontrolled type. The energization of the armature circuit, and hence the speed of the direct current motor, are controlled by controlling the phase of the alternating voltages impressed on the control members of the controlled electric valves. The excitation circuit of the direct current motor is energized from an electrical neutral connection provided by an electrical network energized from the alternating current circuit and from a potential of the uncontrolled electric valves, so that the energization of the excitation circuit is derived from a unidirectional source of substantially constant voltage. Current controlling means are connected in the excitation circuit to control the energization thereof.

In accordance with a further embodiment of my invention, I provide a control circuit for an induction motor in which a direct current motor is arranged to absorb variable amounts of power from the secondary or induced winding of the induction motor through electric valve means of the controlled type. An excitation circuit is provided to energize the control members of the electric valves and includes means for energizing the control members in accordance with the voltage of the induced winding and in accordance with the voltage of an alternating current supply circuit. In this manner, energization of the control members is assured within the complete range of operating speeds of the induction motor, the voltage of the induced winding of the induction motor assuring energization of the control members within the lower range of speed control, and the voltage of the alternating current supply circuit effects energization of the control members within the upper range of speed control.

In accordance with a still further embodiment of my invention, I provide a control system for an induction motor in which a direct current motor absorbs variable amounts of power from the secondary or induced winding of the induction motor through electric valve means of the controlled type. Periodic voltages are impressed on the control members of the electric valves and an arrangement is provided whereby the phase of the periodic voltages and the energization of the excitation circuit of the direct current motor may be varied or controlled simultaneously to control the speed of the induction motor.

Figure 2:
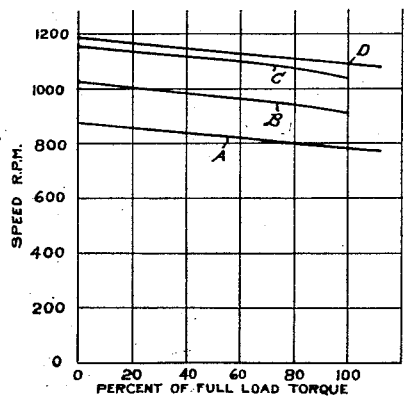
Figure 4:
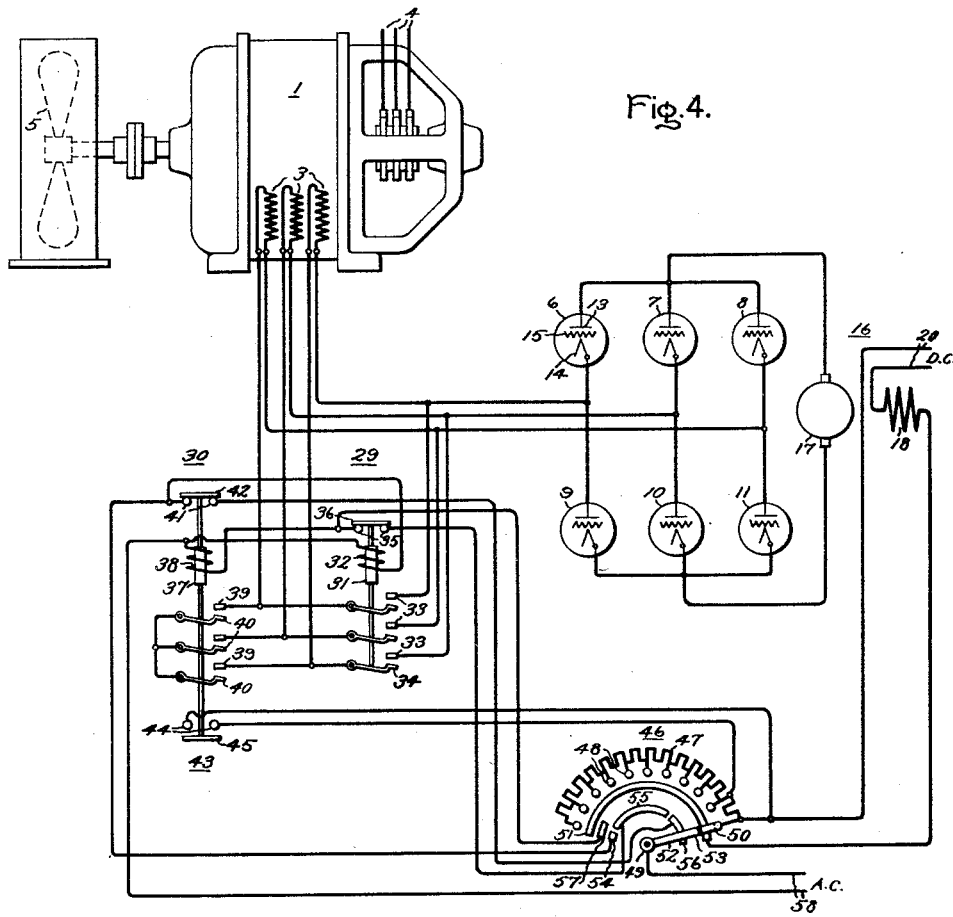
Figure 3:
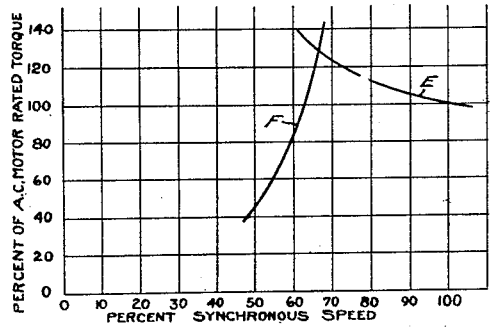
Figure 15:
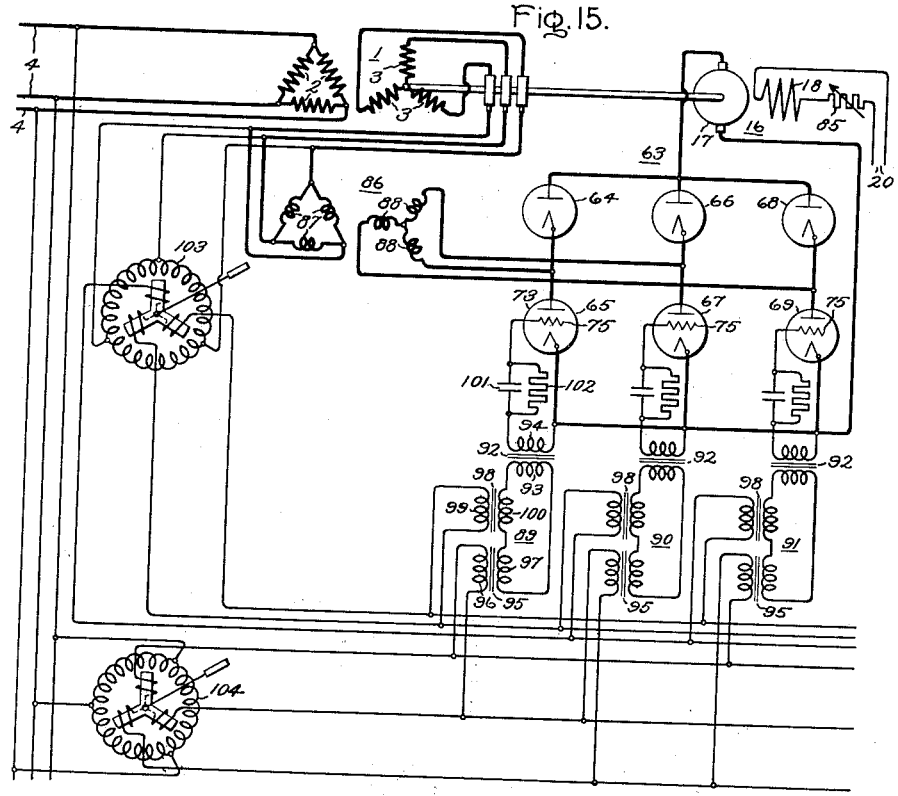
Figure 16:
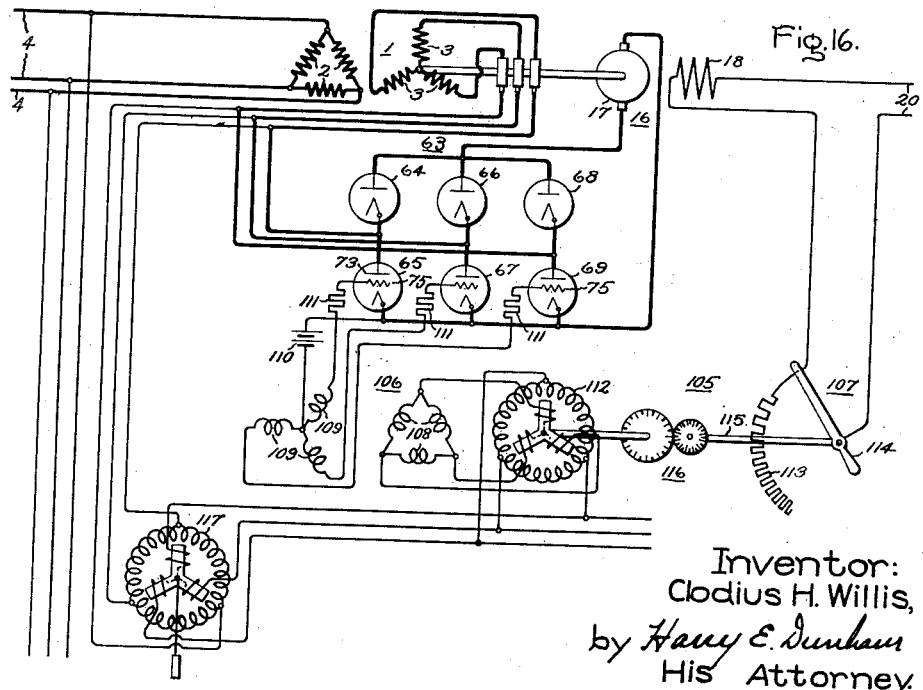
Figure 17:
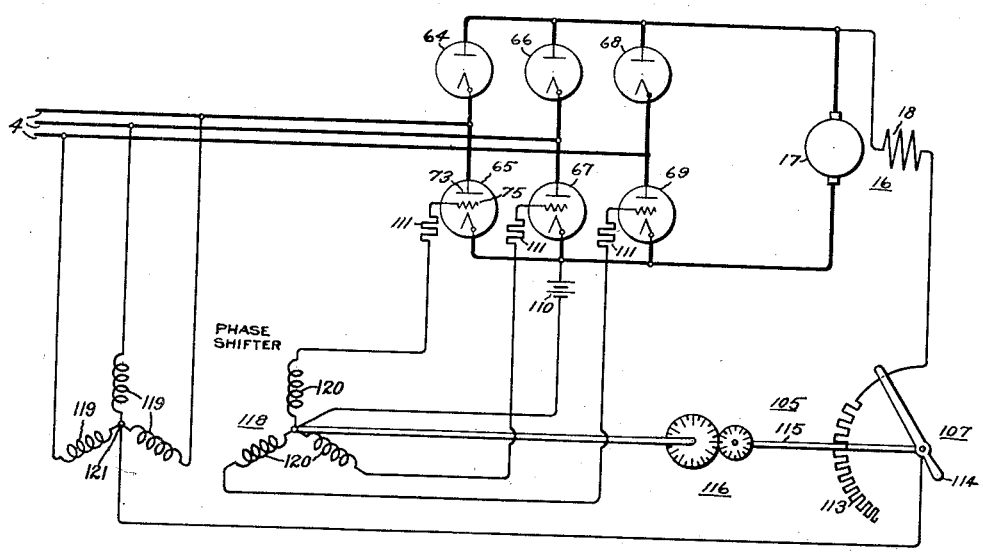

For a better understanding of my invention, reference may be had to the following description taken in connection with the accompanying drawings, and its scope will be pointed out in the appended claims. Fig. 1 of the drawings diagrammatically illustrates an embodiment of my invention as applied to an electric valve control system for an induction motor in which the speed of the induction motor is controlled by controlling the conductivities of the electric valves interposed between the secondary or induced winding and the armature circuit of an associated direct current motor which absorbs variable amounts of power, and Figs. 2 and 3 represent certain operating conditions of the arrangement shown in Fig. 1. Fig. 4 of the accompanying drawings diagrammatically illustrates an embodiment of my invention as applied to an electric valve control system for controlling an induction motor in which the secondary or induced windings may be connected selectively in delta or in wye, and in which variable amounts of power are transmitted between the induced windings and a direct current motor through electric valve means to control the speed of the induction motor. A controlling means is provided to effect simultaneous control of the excitation circuit of the direct current machine and to effect selectively control of the induced winding of the induction motor. Fig. 5 diagrammatically illustrates another embodiment of my invention as applied to an electric valve control system for controlling the speed of an induction motor in which an auxiliary motor-generator set is employed to control the power interchanged between the induced winding of the induction motor and an alternating current supply circuit. The motor-generator set includes a direct current motor and a mechanically coupled alternating current machine of the synchronous type. Fig. 6 represents another embodiment of my invention as applied to an electric valve control system for a direct current motor in which a full wave electric valve apparatus is connected between a polyphase alternating current circuit and the armature circuit of the motor. One half of the electric valves are of the controlled type and the other half are of the uncontrolled type. The controlled electric valves are provided with control members and the variation in speed of the direct current motor is effected by controlling the energization of the control members of the electric valves. The field or excitation circuit of the direct current motor is energized in accordance with the voltage appearing between an electrical neutral connection established by an associated electrical network and a potential of the uncontrolled electric valves. Figs. 7 to 14, inclusive, represent certain operating characteristics relating to the arrangement shown in Fig. 6. Fig. 15 diagrammatically illustrates another embodiment of my invention as applied to an electric valve system for controlling the speed of an induction motor in which the variation in speed is accomplished by controlling the conductivities of the electric valves. Excitation circuits are provided for controlling the valves and these excitation circuits comprise means for energizing the control members of the electric valves from the induced or secondary winding of the induction motor and from the alternating current supply circuit. Fig. 16 represents a still further embodiment of my invention in which the speed of an induction motor is controlled by an electric valve circuit and in which an arrangement is provided for simultaneously controlling the energization of the excitation circuit of an associated direct current motor, and for controlling the conductivity of the electric valve apparatus. Fig. 17 is a modification of the arrangement shown in Fig. 16 as applied to the control of a direct current motor.

In Fig. 1 of the accompanying drawings my invention is diagrammatically illustrated as applied to an electric valve system for controlling an induction motor 1 having primary or inducing windings 2 and secondary or induced windings 3. The primary windings 2 are connected to be energized from any suitable source of alternating current 4. The induction motor 1 may be connected to drive any desired load such as a fan 5.

To control an operating condition or electrical characteristic, such as the speed of the induction motor 1, I employ electric valve apparatus including electric valves 6–11, inclusive, which are connected to the secondary windings 3 of induction motor 2 through conductors 12. The electric valves 6–11 are preferably of the type employing an ionizable medium and each comprises an anode 13, a cathode 14 and a control member 15. As an agency for absorbing variable amounts of power in the form of direct current, I provide a dynamo-electric machine 16 of the direct current type including an armature 17 and a field winding 18. The machine 16 may be directly connected to the rotating member of the induction motor 1 through a shaft 19, or the machine 16 may be connected through power conversion apparatus to transmit power to the alternating current circuit 4 or to any other suitable circuit capable of absorbing power. The field or excitation circuit for the direct current machine 16 may be energized from any suitable source of unidirectional current 20 through a suitable controlling means such as a variable resistance 21. I provide an excitation circuit 22 associated with electic valves 6–11 to control the conductivities thereof and to control the speed of the induction motor 1. The excitation circuit 22 comprises a transformer 23 having primary windings 24 and secondary windings 25 which impress periodic or alternating voltages on the control members 15 of electric valves 6–11. I employ any suitable means such as batteries 26 for impressing negative unidirectional biasing potentials on control members 15, and current limiting resistances 27 may be connected in series relation with the control members. The excitation circuit 22 may be energized from any suitable source of alternating current correlated in phase and frequency relative to the voltage of circuit 4, and in Fig. 1 I have shown the excitation circuit 22 as being energized from circuit 4 through any conventional phase shifting arrangement such as a rotary phase shifter 28. The phase shifter 28 also serves to control the power factor at which power is transmitted from induced winding 3, or, in other words, control the power factor of the induction motor 1.

The operation of the embodiment of my invention shown in Fig. 1 will be explained by considering the induction motor 1 when it is operating below synchronism and when it is desired to increase the speed thereof. It is to be understood that the speed of the induction motor 1 may be controlled either by controlling the energization of field winding 18 or by controlling the conductivities of electric valves 6–11. Of course, the speed of the induction motor 1 may be controlled by the joint control of the excitation of machine 16 and by the control of the conductivities of the electric valves. Assume that the direct current machine 16 is operating as a motor receiving power from the induced winding 3 of induction motor 1 through electric valves 6–11, and further assume that the excitation of winding 18 is fixed at a definite value. The direct current motor 16, therefore, offers a definite counter-electromotive force and the rectified direct current voltage of electric valves 6–11 must match this voltage before current can flow through the armature circuit 17. The direct current voltages of the electric valves 6–11, which are operating as a rectifier, bear a definite ratio to the alternating voltages applied to these valves by induced winding 3 of induction motor 1. In addition, the output voltage of the electric valves 6–11 is determined by the slip of the induction motor 1. The induction motor 1 must, therefore, slow down until the secondary induced voltage is sufficient, when rectified, to match the voltage of the direct current motor 16. Any further reduction in the speed of the induction motor will cause a current to flow in the secondary windings 3 and will produce a corresponding induction motor torque. In this manner the induction motor operates at an approximately constant speed or frequency determined by the counter-electromotive force of the direct current machine 16.

The curves shown in Fig. 2 of the drawings represent certain speed-torque characteristics of an induction motor controlled by the arrangement shown in Fig. 1. The curves A, B, C and D represent the speed-torque characteristics under nominal armature voltage conditions of machine 16. Curve A is the speed-torque characteristic of the induction motor 1 with nominal excitation of field winding 18; curve B represents the same characteristic when the energization of field winding 18 is fifty per cent of the nominal rating, and curve C represents the same characteristic when the field winding 18 is deenergized. Curve D represents the speed-torque characteristic of induction motor 1 when the secondary or induced windings 3 are short circuited. It will be noted that the induction machine 1 under these conditions is essentially a constant speed machine.

Curves E and F of Fig. 3 represent the speed-torque characteristics of the induction motor shown in Fig. 1 utilizing field control and rectifier phase control, respectively, under full load current conditions. It will be noted that the speed control of the arrangement may be extended by employing the rectifier phase control.

The conductivities of the electric valves 6–11 may be controlled to vary the unidirectional voltage impressed across the terminals of the armature winding 17 by controlling the phase of the alternating voltages impressed on control members 15. For a given slip of the induction motor 1, the voltage impressed on the terminals of armature circuit 17 of motor 16 is maximum when there is substantial phase coincidence between the alternating voltages impressed on control members 15 and the voltages impressed on anodes 13 of electric valves 6–11. As the phase of the alternating voltages impressed on the control members 15 is retarded, the output voltage of the rectifier is decreased. For a given energization of the field winding 18, it is to be understood that the power transmitted to the direct current motor 16 will be maximum when there is substantial phase coincidence between the voltages impressed on control members 15 and the anodes 13 and, therefore, the speed of the induction motor 1 will be minimum. In this manner, the effective impedance of the circuit for the secondary windings 3 is increased to decrease the speed of the induction motor 1. Of course, as the phase of the voltage impressed on the control members 15 is retarded, the effective impedance of the induced windings 3 is decreased producing thereby an increase in the speed of the induction motor.

It is to be noted that the speed of induction motor 1 may be controlled by the joint adjustment or control of the energization of the excitation circuit for machine 16 and the control of the voltages impressed on the control members 15 of electric valves 6–11. Furthermore, it is to be noted that the speed of the induction motor 1 may be controlled by controlling the energization of the field winding 18, and the power factor of the induction motor 1 may be controlled independently by controlling the phase shifter 28.

An important advantage of the arrangement shown in Fig. 1 arises from the fact that the operation and rating of the rectifier including electric valves 6–11 are independent of the frequency of the voltage of secondary windings 3. The rating of the rectifier must be, however, approximately equal that of the induction motor 1. The size of the direct current machine will be determined by the speed variation required. In case the direct current motor is connected to the same shaft and assuming that a 2:1 speed ratio is desired, the rating of the direct current machine 16 must equal the rating of the induction motor 1.

Referring now to Fig. 4 of the accompanying drawings, there is shown another embodiment of my invention as applied to an electric valve control system for an induction motor. The arrangement of Fig. 4 is similar in several respects to that shown in Fig. 1 and corresponding elements have been assigned like reference numerals. In the arrangement of Fig. 4, the alternating current circuit 4 is shown as being connected to the rotating member of the induction motor 1. The armature or rotating member of the direct current machine 16 may be mechanically coupled to the rotating member of induction motor 1, or may be connected to any means arranged to absorb power such as an auxiliary motor-generator set for transmitting power to the alternating current circuit 4.

Since the size and rating of the direct current machine 16 is determined by the range of voltages applied thereto, I provide an arrangement for controlling the secondary or induced windings 3 of induction motor 1 to obtain the most efficient utilization of the control system. I provide a pair of contactor controlling mechanisms 29 and 30 which are arranged to connect the secondary windings 3 in mesh connection or in star connection, respectively. When the secondary windings 3 of induction motor 1 are of the three-phase type, these windings may be arranged to be connected in delta or in wye. When both mechanisms are in the closed circuit positions, the secondary windings 3 are effectively short circuited. Contactor controlling mechanism 29 includes a core member 31, an actuating coil 32, stationary contacts 33, movable contacts 34, and an interlocking arrangement including stationary contacts 35 and movable contacts 36. Similarly, the contactor controlling mechanism 30 includes a core 37, an actuating coil 38, stationary contacts 39, movable contacts 40, and an interlocking device including stationary contacts 41 and a movable contact 42. In addition, mechanism 30 is provided with a relay 43 having stationary contacts 44 and a movable contact 45 which controls the energization of field winding 18 of machine 16 during the transition from the delta to the wye connection of the secondary windings 3.

As an agency for effecting selective control of the contactor controlling mechanisms 29 and 30 and as an agency for effecting simultaneous control of the contactor mechanisms and control of the energization of the excitation circuit for the direct current machine 16, I provide a controlling device 46 comprising a resistance 47 provided with a plurality of approximately equally spaced contacts 48 and a cooperating movable contact member 49 having a contact 50 which engages the stationary contacts 48. The controlling device 46 is also provided with a contact 51 which is continually in engagement with movable contact 50. The movable contact member 49 is also provided with movable contacts 52 and 53 which engage stationary contacts 54, 55 and 56, and contact 57, respectively. A suitable source of current, such as an alternating current circuit 58, is employed to energize actuating coils 32 and 38 of the contactor controlling mechanisms 29 and 30, and the selective control of the energization of these coils is effected by the controlling device 46. Energization of actuating coil 32 of the controlling mechanism 29 is effected by the cooperation of contacts 52 and 56; the energization of actuating coil 38 of mechanism 30 is effected by the engagement of contacts 52 and 55, and the energization of both coils 32 and 38 is effected when the controlling member 49 is moved to the left-hand position to effect the simultaneous engagement of contacts 53 and 57, and contacts 52 and 54. The relay 43 is connected to short circuit a portion of resistance 47 when the relay 43 is in the closed circuit position and when the contactor controlling mechanism 30 is in the closed position.

The operation of the embodiment of my invention shown in Fig. 4 will be explained by considering the arrangement when the controlling contact member 49 of the controlling device 46 is in the member position shown in the figure. For this position, the energization of the excitation circuit including winding 18 for the direct current motor 16 is maximum, inasmuch as the resistance 47 is not effective to limit the current in the field winding 18. When in the position shown in the drawings, the contact member 49 effects energization of actuating coil 32 of contactor controlling mechanism 29 to connect secondary windings 3 in delta. The induction motor, of course, will assume a speed corresponding to this connection. As the controlling member 49 is rotated counter-clockwise, the excitation of field winding 18 will be progressively decreased due to the insertion of larger amounts of the resistance 47 in series therewith to effect a gradual increase in speed of the induction motor 1. When the contactor controlling mechanism 29 is in the closed circuit position, stationary contacts 35 and the movable contact 36 are disengaged so that the actuating coil 38 of the controlling mechanism 30 cannot be energized. When the controlling member 49 is moved still further so that contact 52 disengages contact 56 and engages contact 55, coil 32 is de-energized, effecting energization of the coil 38 to connect secondary windings 3 of motor 1 in wye. This action cannot take place until movable contact 36 engages stationary contacts 35, permitting the energization of coil 38. Upon moving to the closed circuit position, the contactor controlling mechanism 30 closes contacts 44 and 45 of relay 43, effecting an increase in the energization of field winding 18 of machine 16 to compensate for the sudden increase in voltage impressed on armature member 17 when the windings 3 are changed from the delta connection to the wye connection. In this manner, the speed is varied in a smooth and precise manner. With this position of the controlling member 49, and when the controlling mechanism 30 is in the closed position, contacts 41 and 42 are disengaged so that coil 32 cannot be energized. The speed of the induction motor may be still further increased by moving the controlling member 49 in a counter-clockwise direction, effecting the increase in speed by progressively decreasing the energization of field winding 18. When the controlling member 49 is in the extreme left-hand position, both windings 32 and 38 are energized to move the associated contacts to the closed circuit position thereby effectively short circuiting the secondary windings 3. Since the windings 3 are effectively short circuited, the speed of the induction motor 1 is maximum. Of course, the speed of the induction motor 1 may be decreased by moving the controlling member 49 from the left-hand position in a clockwise direction of rotation.

An important feature of the embodiment of my invention shown in Fig. 4 is the flexibility and precision of speed control of the induction motor 1 by employing a combination of control arrangements. An additional feature is the economy of apparatus incident to the wye-delta connection of the secondary windings 3, whereby the voltage impressed on armature member 17 of the direct current motor 16 may be maintained within an economic range permitting considerable economy in the apparatus employed. Furthermore, it is to be noted that for a given size and rating of the direct current motor 16, the speed control range of the induction motor 1 may be considerably extended by so controlling the secondary windings 3.

Fig. 5 represents a further modification of my invention as applied to the control of an induction motor. The arrangement of Fig. 5 is similar in many respects to the circuits shown in Figs. 1 and 4 and corresponding elements have been assigned like reference numerals. Instead of mechanically connecting the rotating member of the direct current motor 16 to the rotating member of the induction motor 1, the motor 16 is mechanically connected to an alternating current generator 58 which returns power to the alternating current circuit 4. The generator 58 may be of the synchronous type having armature windings 59 and a field winding 60 which in turn may be energized from any suitable source of unidirectional current 61.

The operation of the arrangement of Fig. 5 is substantially the same as that explained above in connection with Fig. 1. The electric valves 6–11 may be provided with control or excitation circuits to control the power transmitted to the motor 16, and the motor 16 in turn drives the generator 58 to return power to circuit 4. It is to be understood that the excitation of field winding 60 of the alternating current generator 58 may be controlled to better the power factor conditions of circuit 4, that is, may be controlled to supply a leading quadrature current to circuit 4. The arrangement of Fig. 5 may be used in those applications where the main circuit motor operates at a low speed or where the location of the main motor is such that it is inconvenient to connect the direct current motor 16 to the induction motor 1. For a 2:1 speed control, the direct current motor 16 must have a rating equal to one-half that of the main induction motor 1. The alternating current generator 58 in the auxiliary motor-generator set must be large enough to return the power to the supply circuit 4. In case of a constant torque load, the alternating current generator 58 must have approximately the same rating as the direct current motor 16. If, however, the load torque decreases with speed, as in an arrangement for driving a fan, the alternating current generator 58 may be considerably smaller than the direct current motor 16.

Fig. 6 illustrates another embodiment of my invention as applied to an electric valve system for energizing a direct current motor from an alternating current circuit. The direct current motor 16 is energized from an alternating current circuit 62 through electric valve translating apparatus 63 which may be of the full-wave type. One half of the electric valves are of the uncontrolled type and the other half are of the controlled type having control members for controlling the conductivities thereof. The electric valve apparatus 63 includes a plurality of pairs of serially connected electric valves 64—65, 66—67, and 68—69 preferably of the type employing an ionizable medium such as a gas or a vapor. The electric valves 64, 66 and 68 are of the uncontrolled type and each comprises an anode 70 and may include cathodes 71. It is to be understood that the cathodes 71 may be of the filamentary type or may be of the pool type. When the cathodes 71 are of the pool type, the electric valves may also include a pair of holding anodes 72. The holding anodes 72 maintain electric valves 64, 66 and 68 conductive continuously during positive half cycles of applied voltage. Each of the electric valves 65, 67 and 69 includes an anode 73, a pair of cathodes 74, and a control member 75. I provide an excitation circuit 76 for impressing on control members 75 of electric valves 65, 67 and 69 suitable periodic voltages, such as alternating voltages, to render the electric valves conductive in a predetermined order. Suitable sources of negative unidirectional biasing potential such as batteries 77, and current limiting resistances 78, are connected in series relation with control members 75. To control the phase of the alternating voltages impressed on control members 75 relative to the voltages impressed on the associated anodes 73, I employ a rotary phase shifter 79 which permits control of the conductivities of electric valves 65, 67 and 69 and hence controls the voltage impressed on armature 17 of motor 16.

I provide an electrical network 80 comprising a plurality of windings 81 and 82 and associated secondary windings 83. The network 80 also affords an electrical neutral connection 84 which is connected to one terminal of field winding 18 through a current controlling device such as a variable resistance 85. The other terminal of field winding 18 is connected to the common juncture of electric valves 64, 66 and 68, that is, connected to the anodes 70 of these valves. In this manner there is impressed across the terminals of the field winding 18 a substantially constant unidirectional voltage. The control of the energization of the excitation circuit for machine 16 may be effected by adjustment of the variable resistance 85. One terminal of the armature 17 of motor 16 is connected to the anodes of the uncontrolled electric valves 64, 66 and 68 and the other terminal of the armature circuit 17 is connected to the cathodes of the controlled electric valves 65, 67 and 69. Secondary windings 83 of the inductive network 80 serve as a means for energizing the holding anodes 72 of electric valves 64, 66 and 68.

The curves of Figs. 7 and 8 may be referred to in explaining the operation of the embodiment of my invention shown in Fig. 6. More specifically, the curves of Fig. 7 show the manner in which electric valves conduct current when a full-wave rectifier is employed and when all of the electric valves of the group are phase controlled. The curves of Fig. 8 illustrate the operation when only one-half of the electric valves are phase controlled in the manner shown by the arrangement of Fig. 6. The principal advantage of the arrangement of Fig. 6 resides in the provision of a substantially constant voltage source for the excitation of the field winding 18 of machine 16 and which also permits control of the armature voltage of machine 16. Other benefits derived are principally related to a betterment in power factor conditions of the associated supply circuit 62 and a reduction in the current obtained from the supply circuit.

Figure 9:
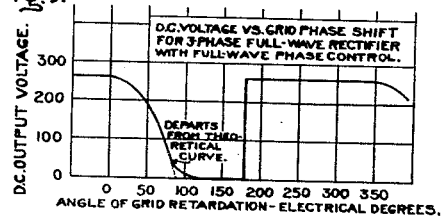
Figure 10:
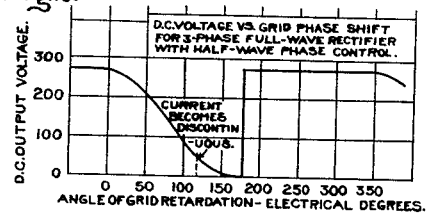
Figure 11:
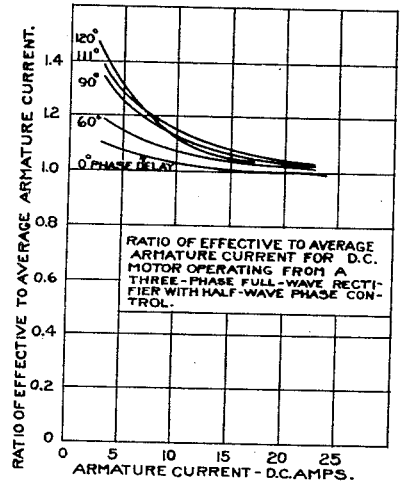
Figure 12:
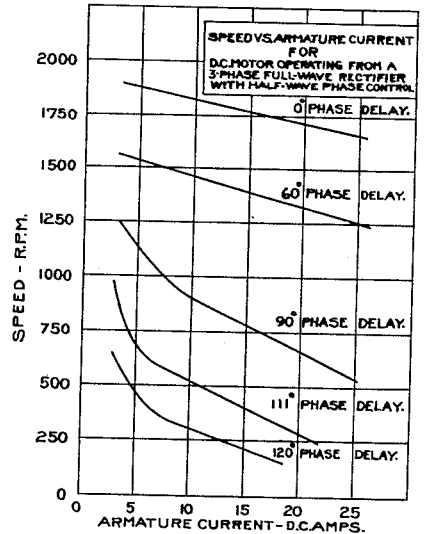
Figure 13:
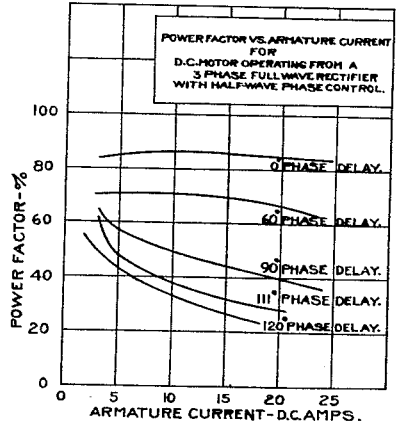
Figure 14:
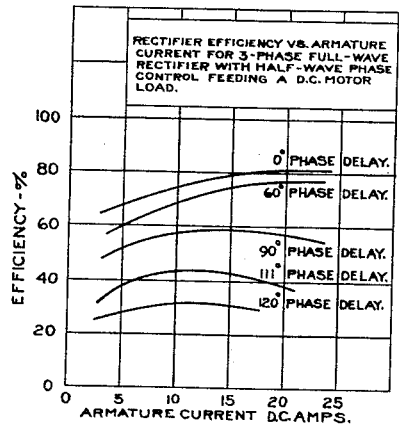

Fig. 9 shows the direct current output voltage as a function of grid voltage retardation where all the electric valves of a full-wave rectifier are phase controlled, and Fig. 10 represents the output voltage as a function of the grid voltage retardation where only half the electric valves are phase controlled. It will be noted that in the lower voltage region the output voltage is extended to a greater range by employing phase shift in only one-half of the electric valves.

Figs. 11–14 appear to be self-explanatory and will not be commented upon at length. These figures represent certain operating characteristics relating to the control of a direct current motor which is energized from a full-wave rectifier and in which only one-half of the electric valves are phase controlled.

Another advantage of the arrangement shown in Fig. 6 is the apparatus economy incident to the employment of the half-wave phase controlled rectifier. It will be noted that the voltage impressed on the excitation winding 18 is of substantially constant magnitude inasmuch as the electric valves 64, 66 and 68 are not controlled. This feature makes it possible to dispense with the need for an auxiliary source of direct current for energizing a field winding and dispenses with the necessity of auxiliary rectifying apparatus where a source of direct current is not available.

Fig. 15 shows another embodiment of my invention in which the electric valve system shown in Fig. 6 is applied to an induction motor control system of the type shown in Fig. 1. The corresponding elements have been assigned like reference numerals. A transformer 86 having primary windings 87 and secondary windings 88 is interconnected between the induced or secondary windings 3 of induction motor 1 and the electric valve apparatus 63 to effect the desired voltage transformation.

I provide a plurality of excitation circuits 89, 90 and 91 which are associated with electric valves 65, 67 and 69, respectively, and which effect energization of the control members 75 in accordance with electrical conditions of the induced windings 3 and in accordance with an electrical condition of the alternating current circuit 4. Each of the excitation circuits 89—91 includes a transformer 92 which may be of the saturable type for producing an alternating voltage of peaked wave form, and comprises a primary winding 93 and a secondary winding 94. Excitation circuits 89—91 are similar in construction and arrangement and in order to facilitate the description thereof, excitation circuit 89 will be considered in detail. In order to introduce into excitation circuit 89 a component of voltage, such as an alternating voltage, to assure energization of the control member 75 for the upper range of speed control of induction motor 1, I employ a suitable inductive device such as a transformer 95 having a primary winding 96 and a secondary winding 97. A transformer 98 having a primary winding 99 and a secondary winding 100 is also connected in excitation circuit 89 to introduce therein a component of voltage, such as an alternating voltage, which varies as the voltage of secondary windings 3 to control the conductivity of the associated electric valve 65 within the lower speed range of induction motor 1. Secondary windings 97 and 100 of transformers 95 and 98, respectively, are connected in series relation with each other and with primary winding 93 of the peaking transformer 92 to effect energization of transformer 92 in accordance with the voltage of secondary windings 3 and in accordance with the voltage of circuit 4. The transformers 95 and 98 may be proportioned so that the voltage of secondary winding 100 predominates within the lower speed range of induction motor 1. A suitable source of negative unidirectional biasing potential is employed to impress on control member 75 a negative biasing voltage. I employ a circuit of the self-biasing type including a parallel connected capacitance 101 and a resistance 102 which are connected in series relation with control member 75. A suitable phase shifting arrangement, such as a rotary phase shifter 103, may be employed to control the phase of the alternating voltages impressed on transformers 98, and a suitable phase shifting arrangement, such as a rotary phase shifter 104, may be employed to control the phase of the alternating voltages impressed on transformers 95. Phase shifters 103 and 104 control the voltage impressed on armature 17 of motor 16 and hence control the speed of induction motor 1.

The operation of the embodiment of my invention shown in Fig. 15 is substantially the same as that explained above in connection with Figs. 1 and 4. The electric valve circuit 63 is controlled by means of excitation circuits 89—91 to control the speed of the induction motor 1. Within the lower range of speed control of induction motor 1, the control members 75 of electric valves 65, 67 and 69 are energized predominately in accordance with the voltage of secondary windings 3, since the output voltage of transformer 98 predominates over the voltage of transformer 95. In this manner, the electric valves 65, 67 and 69 are properly controlled within the lower speed range. When the induction motor 1 is operating within the upper speed range, the slip frequency and hence the voltage induced in secondary windings 3 is small so that it is necessary to derive the excitation for control members 75 from another source, and in the arrangement shown control members 75 of electric valves 65, 67 and 69 are energized from the alternating current circuit 4 through phase shifter 104 and transformers 95 in excitation circuits 89—91. Of course, energization of the excitation circuit including field winding 18 may be varied to control the speed of the induction motor 1.

Fig. 16 represents another embodiment of my invention as related to an electric valve system for controlling an induction motor in which a direct current motor is energized through electric valve means and returns power to the rotating member of the induction motor. The arrangement of Fig. 16 is similar in many respects to that of Fig. 15, and corresponding elements have been assigned like reference numerals. The electric valve apparatus 63 may be of the type in which only one-half of the electric valves are phase controlled, as shown in Fig. 16, or may be of the type in which all of the electric valves are phase controlled.

In order to control conjointly the conductivity of electric valve translating apparatus 63 and the energization of the excitation circuit for direct current motor 16, I provide a control circuit 105 comprising an excitation circuit 106 for controlling the conductivity of the electric valve translating apparatus 63, and a suitable current controlling device such as a rheostat 107 which is connected in circuit with field winding 18 of machine 16. The excitation circuit 106 comprises a transformer having primary windings 108 and secondary windings 109 which impress suitable periodic voltages, such as alternating voltages, on control members 75 of electric valves 65, 67 and 69. A suitable source of negative biasing potential, such as a battery 110, may be employed and current limiting resistances 111 may be connected in series relation with control members 75. A suitable phase shifting arrangement, such as a rotary phase shifter 112, may be connected to excitation circuit 106 to provide an arrangement for controlling the phase of the periodic voltages impressed on control members 75. The current controlling means 107 may comprise a resistance 113 and an actuating member 114. The actuating member 114 is arranged to produce simultaneous control of the energization of winding 18 of machine 16 and control of the phase of the periodic voltages impressed on control members 75. One way in which this simultaneous or joint control may be effected is by the employment of a shaft 115 which interconnects the actuating member 114 and the rotary phase shifter 112. The current controlling means 107 and the excitation circuit 106 may be arranged to control the transfer of power from induced windings 3 to machine 16 in three distinct ways within the various ranges of speed. One way in which this type of speed control may be effected is by design of the resistance 113, so that within the lower range of speed control the transfer of power between induced windings 3 and machine 16 is effected primarily by the phase control of the electric valves. The upper portion of resistance 113 is arranged so that for a predetermined displacement of the actuating member 114 the energization of the field winding 18 is not varied. For an intermediate speed range, the control of the transfer of power between windings 3 and machine 16 is effected by the conjoint control of the excitation of machine 16 and the control of the conductivities of the electric valves. Within the upper range of speed control, the transfer of power between windings 3 and machine 16 is effected primarily by controlling the excitation of machine 16 by controlling the resistance in series with field winding 18. A suitable gear mechanism 116 may be employed to obtain the desired angular displacements of the rotary phase shifter 112 in accordance with adjustment of the actuating member 114.

The excitation circuit 106 may be energized from any suitable source of alternating current correlated in phase and frequency relative to the voltage of the induced winding 3 of machine 1, and is shown as being connected to the induced winding 3. A suitable phase shifting arrangement, such as a rotary phase shifter 117, is interposed between the induced winding 3 and the excitation circuit 106 to permit adjustment of the phase of the periodic voltages impressed on control members 75 of electric valves 65, 67 and 69.

The operation of the embodiment of my invention shown in Fig. 16 is similar in many respects to that explained above in connection with Fig. 15. An operating condition, such as the speed of induction motor 1, may be controlled by causing the direct current motor 16 to absorb variable amounts of power from the induced winding 3 through the electric valve apparatus 63. The speed of induction motor 1 may be controlled by the adjustment of the actuating member 114, which controls the energization of field winding 18 of machine 16 and controls the conductivities of electric valves 65, 67 and 69. For the position of the actuating member 114 shown in Fig. 16, the speed of the induction motor 1 will be minimum. The speed of the induction motor 1 may be increased by rotating the actuating member 114 in a counter-clockwise direction of rotation. At the minimum speed value, the field excitation of machine 16 is maximum and the armature voltage of machine 16 is zero. Within the first range of speed control, the field resistance is maintained substantially constant and the speed is increased substantially by increasing the voltage impressed on armature 17 of machine 16 due to the advance in phase of the voltages impressed on control members 75. Within the intermediate range of speed control, the excitation of machine 16 and the armature voltage impressed on armature 17 are varied simultaneously. That is, within the intermediate range, resistance is inserted in series with field winding 18 and the armature voltage is increased. Within the third or upper range of speed control, an increase in speed is effected primarily by decreasing the energization of field winding 18 by the insertion of a larger amount of resistance in series therewith. During this last range of speed control, the voltage impressed on armature 17 of machine 16 is substantially constant. The operating characteristics shown in Fig. 10 may be referred to in explaining the effect of the control of the conductivities of electric valves 65, 67 and 69 with respect to these ranges of speed control. Within the first range of speed control, the voltages impressed on control members 75 are advanced in phase from approximately the one hundred degree position to the fifty degree position; within the second or intermediate range of speed control the voltages impressed on control members 75 are advanced in phase from the fifty degree position to zero position; and within the third or upper speed range, the voltages are advanced in phase beyond the zero position. By this arrangement it is clear that the conjoint control of the excitation of machine 16 and the control of the armature voltage may be effected without employing apparatus which is complicated in construction and operation. The rotary phase shifter 117 may be adjusted to control independently the speed of the motor 1 and the power factor at which power is transmitted from induced windings 3. In this manner, the power factor of the induction motor 1 may be controlled independently.

In Fig. 17 of the accompanying drawings there is diagrammatically illustrated a modification of the arrangement shown in Fig. 16 as applied to an electric valve circuit for controlling the speed of a direct current motor. Many of the elements of the arrangement shown in Fig. 17 are similar to those shown in Fig. 16 and corresponding elements have been assigned like reference numerals. The armature 17 of the motor 16 is connected to be energized from the alternating current circuit 4 through electric valves 64—69. Electric valves 64, 66 and 68 are of the uncontrolled type and electric valves 65, 67 and 69 are of the controlled type which control the voltage impressed on armature 17.

As an agency for controlling the conductivities of electric valves 65, 67 and 69 and as an arrangement for providing an electrical neutral connection for field winding 18 of machine 16, I provide a phase shifter 118 having primary windings 119 and secondary windings 120. Primary windings 119 are connected to provide an electrical neutral connection 121 which is connected to one terminal of field winding 18 through the controller 107. The other terminal of the field winding 18 is connected to the armature 17 and the common juncture of the uncontrolled electric valves 64, 66 and 68. Secondary windings 120 of phase shifter 118 impress alternating voltages on control members 75 of electric valves 65, 67 and 69.

The operation of the arrangement shown in

Fig. 17 is substantially the same as that explained above in connection with the control system of Fig. 16. Briefly, the speed of the direct current motor 16 is controlled by variation in the voltage applied to the armature 17 and by control of the energization of the field winding 18. The controller 107 and the phase shifter 118 are arranged to obtain the above described three ranges of speed control. That is, in the first or lower range of speed control, the variation in speed of motor 16 is obtained primarily by control of the armature voltage of machine 16; the second or intermediate range of speed control is obtained by the conjoint variation in the excitation of machine 16 and by the variation of armature voltage; and in the third or upper range of speed control the variation in speed of machine 16 is effected primarily by control of the excitation of machine 16.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an induction motor having polyphase inducing and induced windings, said induced windings being arranged to be connected in delta or in wye, a direct current motor arranged to absorb variable amounts of electric power and having armature and excitation circuits, electric valve means connected between said induced windings and said armature circuit, and a circuit for controlling the speed of said induction motor comprising means for simultaneously varying the energization of said excitation circuit and selectively connecting said induced windings in delta or in wye and means for abruptly changing the energization of said excitation circuit at the time of transition from the delta connection to the wye connection.

2. In combination, an induction motor having polyphase inducing and induced windings, said induced windings being arranged to be connected in delta or in wye, a direct current motor arranged to absorb variable amounts of electric power and having armature and excitation circuits, electric valve means connected between said induced windings and said armature circuit, and a circuit for controlling the speed of said induction motor comprising means for simultaneously varying the energization of said excitation circuit and selectively connecting said induced windings in delta or in wye and means for increasing the energization of said excitation circuit at the time of transition from the delta connection to the wye connection.

3. In combination, an induction motor having polyphase inducing and induced windings, said induced windings being arranged to be connected in delta or in wye, a direct current motor arranged to absorb variable amounts of electric power and having armature and excitation circuits, electric valve means connected between said induced windings and said armature circuit, and a circuit for controlling the speed of said induction motor comprising means for simultaneously varying the energization of said excitation circuit and selectively connecting said induced windings in delta or in wye and means for abruptly decreasing the energization of said excitation circuit at the time of transition from the wye connection to the delta connection.

4. In combination, an induction motor having polyphase inducing and induced windings, said induced windings being arranged to be connected in delta or in wye, a direct current motor arranged to absorb variable amounts of electric power and having armature and excitation circuits, electric valve means connected between said induced winding and said armature circuit, and a circuit for controlling the speed of said induction motor comprising a resistance connected in said excitation circuit, means for selectively connecting said induced windings in delta or in wye and means for controlling simultaneously said resistance and said last mentioned means.

5. In combination, an induction motor having polyphase inducing and induced windings, a pair of contactor mechanisms for connecting said induced windings in delta or in wye, a direct current motor arranged to absorb variable amounts of electric power and having armature and excitation circuits, electric valve means connected between said induced windings and said armature circuit, and a circuit for controlling the speed of said induction motor comprising a resistance connected in said excitation circuit, means for selectively controlling said contactor mechanisms and means for controlling simultaneously said resistance and said last mentioned means.

6. In combination, an induction motor having polyphase inducing and induced windings, a pair of contactor mechanisms arranged to connect said inducing windings in delta or in wye, a direct current motor arranged to absorb variable amounts of electric power and having armature and excitation circuits, electric valve means connected between said induced windings and said armature circuit, and a circuit for controlling the speed of said induction motor comprising a resistance connected in said excitation circuit, means for controlling said contactor mechanisms selectively to connect said induced winding in wye or in delta or to short circuit said induced windings and means for short circuiting at least a portion of said resistance at the time of transition from the delta connection to the wye connection.

7. In combination, an alternating current circuit, an induction motor having inducing and induced windings, said inducing winding being connected to said circuit, a dynamo-electric machine of the direct current type mechanically coupled to said motor and having armature and excitation circuits, electric translating apparatus connected between said induced winding and said armature circuit and comprising a plurality of pairs of serially connected electric valves, said pairs of electric valves being connected across the armature circuit and each pair of electric valves comprising a controlled electric valve and an uncontrolled electric valve, the controlled electric valves each comprising a control member for controlling the conductivities thereof, and means for energizing the control members to control an operating condition of said induction motor.

8. In combination, a polyphase alternating current circuit, an induction motor having inducing and induced windings, said inducing winding being connected to said circuit, a dynamo-electric machine of the direct current type having armature and excitation circuits, electric translating apparatus connected between said induced winding and said armature circuit and comprising a plurality of pairs of serially connected electric valves, said pairs of electric valves being connected across the armature circuit and each pair of electric valves comprising a controlled electric valve and an uncontrolled electric valve, the controlled electric valves each comprising a control member for controlling the conductivities thereof, means for controlling the energization of said excitation circuit, and means for energizing the control members to control the speed of said induction motor.

9. In combination, an alternating current circuit, an induction motor having inducing and induced windings, a dynamo-electric machine of the direct current type, electric valve means connected between said machine and the induced winding and having a control means for controlling the conductivity thereof, an excitation circuit for energizing the control means, means for introducing in said excitation circuit a component of voltage derived from said alternating current circuit, and means for introducing in said excitation circuit a component of voltage derived from said induced winding.

10. In combination, an alternating current circuit, an induction motor having inducing and induced windings, a dynamo-electric machine of the direct current type, electric valve means connected between said machine and the induced winding and having a control means for controlling the conductivity thereof, an excitation circuit for energizing the control means, means for introducing in said excitation circuit an alternating voltage derived from said alternating current circuit, and means for introducing in said excitation circuit an alternating voltage derived from said induced winding.

11. In combination, an alternating current circuit, an induction motor having inducing and induced windings, a dynamo-electric machine of the direct current type, electric valve means connected between said machine and the induced winding and having a control means for controlling the conductivity thereof, an excitation circuit comprising a saturable transformer for impressing on said control member a voltage of peaked wave form, and means for energizing said transformer conjointly in accordance with the voltage of said alternating current circuit and the voltage of said induced winding.

12. In combination, an alternating current circuit, an induction motor having inducing and induced windings, a dynamo-electric machine of the direct current type, electric valve means connected between said machine and the induced winding and having a control means for controlling the conductivity thereof, an excitation circuit comprising a saturable transformer for impressing on said control member a voltage of peaked wave form, an excitation circuit comprising a transformer of the saturable type for impressing on said control means a voltage of peaked wave form and comprising a primary winding, and a pair of serially connected inductive devices in series relation with the primary winding for energizing said primary winding in accordance with the voltage of said alternating current circuit and the voltage of said induced winding, one of said inductive devices being connected to said alternating current circuit and the other of said devices being connected to said induced winding.

13. In combination, an induction motor having inducing and induced windings, said inducing winding being connected to said alternating current circuit, a direct current motor having armature and excitation circuits and being arranged to absorb variable amounts of power to control the speed of said induction motor, electric valve means connected between said induced winding and said armature circuit for transmitting power therebetween and comprising control means for controlling the conductivity thereof, and an excitation circuit comprising means for energizing said control means from said alternating current circuit within the upper range of speed of said induction motor and means for energizing said control means from said induced winding within the lower range of speed of said induction motor.

14. In combination, an alternating current circuit, an induction motor having inducing and induced windings, said inducing winding being connected to said circuit, a dynamo-electric machine of the direct current type, electric valve means connected between said machine and the induced winding and having a control means for controlling the conductivity thereof, an excitation circuit for energizing said control means, means for introducing in said excitation circuit an alternating voltage derived from said alternating current circuit, means for introducing in said excitation circuit an alternating voltage derived from said induced winding, and means for controlling the phase relationship of said alternating voltages.

15. In combination, an alternating current circuit, an induction motor having inducing and induced windings, said inducing winding being connected to said circuit, a dynamo-electric machine of the direct current type, electric valve means connected between said machine and the induced winding and having a control means for controlling the conductivity thereof, an excitation circuit for energizing said control means, means for introducing in said excitation circuit an alternating voltage derived from said alternating current circuit, means for controlling the phase of said alternating voltage relative to the voltage of said alternating current circuit, means for introducing in said excitation circuit an alternating voltage derived from said induced winding, and means for controlling the phase of said last named alternating voltage relative to the voltage of said induced winding.

16. In combination, an alternating current circuit, an induction motor having inducing and induced windings, said inducing winding being connected to said circuit, a dyamo-electric machine of the direct current type having armature and excitation circuits, electric translating apparatus connected between said induced winding and said armature circuit for transmitting power therebetween and comprising a plurality of pairs of serially connected electric valves, said pairs of electric valves being connected across said armature circuit and each comprising a serially connected uncontrolled and a controlled electric valve, the controlled electric valves each having a control member for controlling the conductivity thereof, an excitation circuit for impressing periodic voltages on said control members, and means for controlling simultaneously the energization of said excitation circuit and the phase of the voltages impressed on said control members.

17. In combination, an alternating current circuit, an induction motor having inducing and induced windings, said inducing winding being connected to said circuit, a dynamo-electric machine of the direct current type having armature and excitation circuits, electric translating apparatus connected between said induced winding and said armature circuit and comprising an uncontrolled electric valve and a controlled electric valve connected in series relation, said controlled electric valve having a control member for controlling the conductivity thereof, and means for controlling simultaneously the energization of said excitation circuit and the energization of said control member.

18. In combination, an alternating current circuit, an induction motor having inducing and induced windings, said inducing winding being connected to said circuit, a dynamo-electric machine of the direct current type having armature and excitation circuits, electric translating apparatus connected between said induced winding and said armature circuit and comprising an uncontrolled electric valve and a controlled electric valve connected in series relation, said controlled electric valve having a control member for controlling the conductivity thereof, a control circuit for impressing on said control member an alternating voltage, a current controlling device connected in said excitation circuit, and means for controlling simultaneously said device and the phase of said alternating voltage to control an electrical characteristic of said induction motor.

19. In combination, an alternating current circuit, an induction motor having inducing and induced windings, said inducing winding being connected to said circuit, a dynamo-electric machine of the direct current type having armature and excitation circuits, electric valve means connected between said induced winding and said armature circuit and including control means for controlling the conductivity thereof, a control circuit for impressing on said control means a periodic voltage, means for controlling simultaneously the energization of said excitation circuit and the phase of said periodic voltage, and means for controlling independently the phase of said periodic voltage.

20. In combination, an alternating current circuit, an induction motor having inducing and induced windings, said inducing winding being connected to said circuit, a dynamo-electric machine of the direct current type having armature and excitation circuits, electric valve means connected between said induced winding and said armature circuit and including control means for controlling the conductivity thereof, a control circuit for impressing on said control means a periodic voltage, a circuit for controlling the speed of said induction motor comprising means for controlling simultaneously the energization of said excitation circuit and the phase of said periodic voltage, and means for controlling independently the phase of said periodic voltage to control the speed of said induction motor.

21. In combination, an alternating current circuit, an induction motor having inducing and induced windings, said inducing winding being connected to said circuit, a dynamo-electric machine of the dirert current type having armature and excitation circuits, electric valve means connected between said induced winding and said armature circuit and including control means for controlling the conductivity thereof, and apparatus for controlling the speed of said induction motor comprising a control circuit for impressing on said control means a periodic voltage, variable impedance means for controlling the energization of said excitation circuit and actuating means interconnecting said control circuit and said variable impedance means, said variable impedance means being arranged so that within the lower range of speed control substantially no variation in impedance is effected so that the speed is controlled principally by variations in the conductivity of said electric valve means and arranged to produce greater variations in impedance within the upper range of speed control so that the speed within the latter range is effected principally by the variations in the energization of said excitation circuit.

22. In an electric system for an induction motor including a direct current motor energized from a secondary winding of the induction motor through electric valve means of the controlled type, the method of speed control which comprises varying the speed of the induction motor within a lower range by controlling the conductivity of the electric valve means, controlling the speed of the induction motor within an intermediate range by conjointly varying the excitation of the direct current motor and the conductivity of the electric valve means, and controlling the speed of the induction motor within an upper range of speed control principally by varying the excitation of the direct current motor.

23. In combination, an alternating current circuit, an induction motor having inducing and induced windings, said inducing winding being connected to said circuit, electric translating apparatus comprising a direct current motor and an alternating current generator mechanically coupled to said direct current motor and having an armature winding connected to said circuit, electric valve means connected between said induced winding and said direct current motor for supplying direct current thereto, said electric valve means having control means for controlling the conductivity thereof, and means for energizing said control means to control an operating condition of said induction motor.

24. In combination, an alternating current circuit, an induction motor having inducing and induced windings, said inducing winding being connected to said circuit, electric translating apparatus comprising a mechanically coupled direct current motor and an alternating current generator of the synchronous type, said generator having an armature winding connected to said circuit and having an excitation circuit, electric valve means connected between said induced winding and said direct current motor for transmitting unidirectional current thereto, said electric valve means having control means for controlling the conductivity thereof, and means for energizing said control means to control the amount of power transmitted to said direct current motor to effect control of the speed of said induction motor.

CLODIUS H. WILLIS.